(12) United States Patent
Conseil

(10) Patent No.: US 8,922,966 B2
(45) Date of Patent: Dec. 30, 2014

(54) METHOD OF FORMING A DETECTION CIRCUIT AND STRUCTURE THEREFOR

(75) Inventor: Stephanie Conseil, Colomiers (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 868 days.

(21) Appl. No.: 12/991,727

(22) PCT Filed: Jun. 26, 2008

(86) PCT No.: PCT/US2008/068402
§ 371 (c)(1),
(2), (4) Date: Nov. 9, 2010

(87) PCT Pub. No.: WO2009/157937
PCT Pub. Date: Dec. 30, 2009

(65) Prior Publication Data
US 2011/0058287 A1    Mar. 10, 2011

(51) Int. Cl.
| H02H 5/04 | (2006.01) |
| G06F 1/32 | (2006.01) |
| H02M 1/08 | (2006.01) |
| H02M 1/32 | (2007.01) |
| H02M 3/335 | (2006.01) |

(52) U.S. Cl.
CPC .............. *G06F 1/3287* (2013.01); *H02M 1/08* (2013.01); *H02M 1/32* (2013.01); *H02M 3/33523* (2013.01); *H02M 3/33538* (2013.01)
USPC ........................................................ 361/93.8

(58) Field of Classification Search
USPC .................... 361/18, 91.1, 88–103, 115, 93.8
See application file for complete search history.

(56) References Cited

U.S. PATENT DOCUMENTS

| 5,796,278 | A | * | 8/1998 | Osborn et al. | ................ 327/108 |
| 6,094,362 | A | * | 7/2000 | Domingo | ..................... 363/56.1 |
| 6,252,783 | B1 | * | 6/2001 | Huh et al. | ................... 363/21.01 |
| 7,830,120 | B2 | * | 11/2010 | Ibrahim | ........................ 320/134 |
| 8,570,018 | B2 | * | 10/2013 | Lai | ................. 323/284 |
| 2001/0002102 | A1 | * | 5/2001 | Petricek et al. | ............... 323/224 |
| 2005/0152164 | A1 | * | 7/2005 | Balakrishnan et al. | ......... 363/95 |
| 2006/0209581 | A1 | * | 9/2006 | Choi et al. | .................... 363/120 |
| 2006/0261678 | A1 | * | 11/2006 | Khayat et al. | ................. 307/151 |
| 2006/0291111 | A1 | * | 12/2006 | Itoh | ................ 361/18 |
| 2008/0192398 | A1 | * | 8/2008 | Inoue | ............................ 361/103 |
| 2008/0278868 | A1 | * | 11/2008 | Morino | ........................ 361/18 |
| 2009/0212753 | A1 | * | 8/2009 | Lou | ................ 323/277 |
| 2010/0046123 | A1 | * | 2/2010 | Fukami | ............................ 361/18 |
| 2010/0321845 | A1 | * | 12/2010 | Imura et al. | .................... 361/86 |

* cited by examiner

*Primary Examiner* — Thienvu Tran
*Assistant Examiner* — Christopher Clark
(74) *Attorney, Agent, or Firm* — Robert F. Hightower

(57) ABSTRACT

In one embodiment, a power supply controller is configured to use a current to detect two different operating conditions on a single input terminal.

20 Claims, 2 Drawing Sheets

US 8,922,966 B2

METHOD OF FORMING A DETECTION CIRCUIT AND STRUCTURE THEREFOR

BACKGROUND OF THE INVENTION

The present invention relates, in general, to electronics, and more particularly, to semiconductors, structures thereof, and methods of forming semiconductor devices.

In the past, the semiconductor industry utilized various methods and structures to form power supply controllers that regulated an output voltage to a desired value. Some advantages features of those power supply controllers included a method to detect an over-temperature condition of the ambient environment of the power supply controller and a method to detect an over-voltage condition of the input voltage used for operating the power supply controller. In order to detect these two different conditions, the power supply controller generally used two respective inputs. Using two inputs resulted in using two terminals of a semiconductor package for these two conditions. Due to the limited number of terminals on a semiconductor package, using two terminals for the two different operating conditions often prevented incorporating other features into the power supply controller.

Additionally, the two different conditions generally were detected by monitoring a change in a voltage that represented the condition. The various circuits required to detect the voltage condition resulted in inaccuracies.

Accordingly, it is desirable to have a power supply controller that can detect an over-voltage and an over-temperature condition on a single input of the power supply controller, and that more accurately detects the two conditions.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described.

DETAILED DESCRIPTION OF THE DRAWINGS

Figure 1:
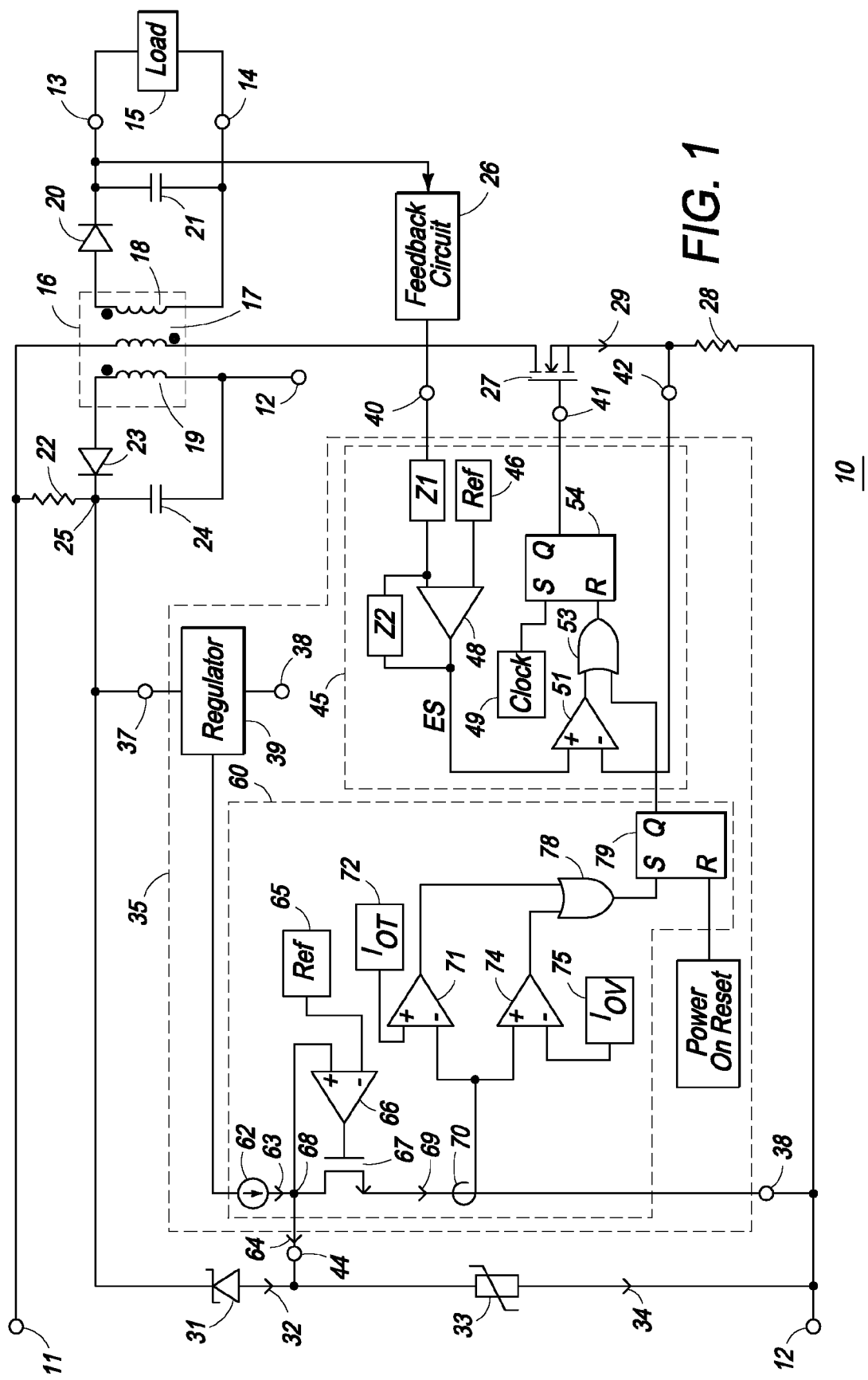
FIG. 1 schematically illustrates an embodiment of a portion of a power supply system which includes an exemplary embodiment of a power supply controller in accordance with the present invention.

FIG. 1 schematically illustrates an embodiment of a portion of a power supply system 10 which includes an exemplary embodiment of a power supply controller 35. Controller 35 is configured to form a sense signal that is representative of two different operating conditions that are external to controller 35, such as an over-temperature condition of the ambient environment of controller 35 and an over-voltage condition of an input voltage used for operating controller 35. Controller 35 is configured to form the sense signal on a single input of controller 35. A zener diode 31 and a negative temperature coefficient (NTC) resistor 33 that are external to controller 35 assist in detecting the two conditions. System 10 receives power between a voltage input terminal 11 and a common reference terminal 12, and supplies an output voltage between an output 13 and an output return 14. The output voltage usually is regulated to a desired value or target value within a range of values around the target value. For example, the target value may be five volts (5V) and the range of values may be plus or minus five percent (5%) around the five volts. System 10 includes a transformer 16 that has a primary winding 17, a secondary winding 18, and an auxiliary winding 19. A power switch, such as a transistor 27, is used to control the value of a current 29 that flows through winding 17 and transistor 27 in order to regulate the value of the output voltage. A current sense element, such as a sense resistor 28, is used to form a current sense (CS) signal that is representative of current 29. Those skilled in the art will appreciate that other well-known current sense elements may be used instead of resistor 28. Current 29 determines the amount of current that is supplied to a load that includes capacitor 21 and a load 15 that is connected between output 13 and return 14.

A diode 20 usually is connected to winding 18 along with a capacitor 21 to assist in forming the output voltage between output 13 and return 14. A feedback circuit 26 provides a feedback (FB) signal that is representative of the value of the output voltage. Feedback circuit 26 may be any of a variety of well-known feedback circuits such as an optical coupler that provides isolation between the primary and secondary sides of transformer 16 and system 10. Auxiliary winding 19 is utilized to provide an auxiliary voltage at a node 25 for operating controller 35. A diode 23, a capacitor 24, and a resistor 22 assist in forming the auxiliary voltage from the voltage and current induced into winding 19. The auxiliary winding circuit formed by winding 19, diode 23, and capacitor 24 is a well-known auxiliary winding power supply circuit.

Controller 35 is configured to receive the auxiliary voltage for operating controller 35 between a voltage input 37 and a voltage return 38. Voltage input 37 generally is connected to node 25 in order to receive the auxiliary voltage, and return 38 generally is connected to common reference terminal 12 in order to receive the common reference voltage. Controller 35 is also configured with a feedback (FB) input 40 that receives the feedback (FB) signal from feedback circuit 26, a drive output 41 that is configured to provide a switching drive signal for operating transistor 27, and a current sense (CS) input 42 that is configured to receive the current sense (CS) signal. Controller 35 also includes a detection circuit 60 and usually includes a switching control circuit 45. Switching control circuit 45 may be any of a variety of well-known switching control circuits that are utilized for switching power supply controllers. For example, circuit 45 may be a PWM control circuit, a PFM control circuit, or a hysteretic switching control circuit. The exemplary embodiment of switching control circuit 45 illustrated in FIG. 1 includes an error amplifier 48 that receives the feedback signal and forms an error signal (ES) that is representative of the difference between a desired value of the output voltage and the actual value of the output voltage. As is well known in the art, error amplifier 48 generally includes frequency compensation components, such as impedances Z1 and Z2, that are used to provide frequency compensation for the closed control loop formed by controller 35. A comparator 51 compares the error signal to the current sense signal in order to control the operation of transistor 27 under normal operating conditions. A clock circuit 49 forms a clock signal that sets latch 54 to assert the switching drive signal. An OR gate 53 receives a control signal from circuit 60 and resets latch 54 to negate the switching drive signal to disable transistor 27 and terminate current 29. Controller 35 usually also includes an internal regulator 39 that receives the input voltage and forms an internal operating voltage to operate elements of controller 35 such as circuits 45 and 60.

A sense input 44 of controller 35 is configured to form a sense signal that is representative of the two different operating conditions, such as an over-temperature condition and an over-voltage condition. Detection circuit 60 is configured to detect the two operating conditions and to cause switching control circuit 45 to responsively negate the switching drive signal on output 41. Detection circuit 60 includes a current source 62, a first current comparator 71, a second current comparator 74, a current sense circuit 70, and a logic circuit that includes an OR gate 78 and a latch 79. Detection circuit 60 also includes a shunt regulator circuit that has an amplifier 66, a transistor 67, and a voltage reference generator or ref 65. The shunt regulator of ref 65, amplifier 66, and transistor 67 forms a voltage at a node 68 that is substantially equal to the voltage on the output of ref 65. Thus, the shunt regulator circuit maintains input 44 at a substantially fixed voltage value.

During normal operating conditions, the voltage at node 25 is within the desired operating range and is less than the zener voltage of diode 31 so that substantially no current is flowing through diode 31. Current source 62 forms a current 63 that has a substantially fixed current value. Current 63 flows through transistor 67 and is coupled to output 44 at node 68. A first portion of current 63 flows through input 44 as a current 64 to NTC resistor 33. The value of current 64 ensures that the voltage drop across NTC resistor 33 is the value of the voltage formed by the shunt regulator. A second portion of current 63 flows as a current 69 to return 38. Current sense circuit 70 senses the value of current 69. The output of circuit 70 is received by current comparators 71 and 74. Current comparator 71 compares current 69 to the value of a reference current from a current reference generator 72 and current comparator 74 compares current 69 to the value of a reference current from a current reference generator 75. Under normal operating conditions, the value of current 69 is greater than the value from generator 72 so that the output of comparator 71 is low. Additionally, the value of current 69 is less than the value of the reference current from generator 75 so that the output of comparator 74 is also low. Consequently, the output of gate 78 is low. Typically, latch 79 is initialized by a power on reset circuit to a reset condition when power is applied to controller 35. Thus, latch 79 is reset and is not affected by the low from gate 78.

If the temperature of the ambient environment of controller 35 increases, the resistance of NTC resistor 33 decreases. Because the shunt regulator forces the voltage on input 44 to a substantially constant value, the value of current 64 has to increase in order to maintain the voltage at input 44 substantially constant. Because a larger portion of current 63 flows through the input 44, the value of current 69 decreases. Thus, circuit 60 changes the first value of current 64 to a second value. The decreased value of current 69 decreases the output of sensor 70. If the value of current 69 decreases past the value of the current from generator 72, the output of sensor 70 decreases sufficiently to force the output of comparator 71 high to set latch 79. The high from latch 79 is received by switching control circuit 45 which responsively resets PWM latch 54 and negates the switching drive signal in order to terminate the regulation of the output voltage. Typically, latch 79 remains in this set condition and system 10 terminates the regulation of the output voltage until power is removed from and then reapplied to controller 35 which allows the power-on reset circuit to again reset latch 79.

If the value of the input voltage at node 25 increases past the value of the zener voltage of diode 31 plus the value of the voltage from ref 65, a current 32 flows through diode 31. Because of the fixed voltage at input 44, currents 32 and 63 are summed at input 44, thus at node 68, to form current 34 that flows through NTC resistor 33 to form the fixed voltage across resistor 33. Summing currents 64 and 32 at node 68 changes the value of current 64 and increases the value of current 69. The increased value of current 69 increases the output of sensor 70. If the value of current 69 increases past the value of the current from generator 75, the output of sensor 70 increases sufficiently to force the output of comparator 74 high to again set latch 79 and terminate the switching drive signal on output 41.

If both the input voltage increases and the temperature increases, diode 31 can supply more current that current source 62 so the value of current 32 increases the value of current 69. The increased value of current 69 increases the output of sensor 70 which forces the output of comparator 74 high to terminate the switching drive signal. Thus, it can be seen that detection circuit 60 is configured to maintain input 44 at substantially a first voltage value and to couple current 63 to input 44. Current 32 flows to input 44 from external to controller 35. Controller 35 negates the switching drive signal responsively to a first value of current 64 and negates the switching drive signal responsively to a first value of current 32. Detection circuit 60 is configured to receive the sense signal on input 44 and change the value of current 64 to a second value responsively to an over-temperature condition and to change the value of current 64 to a third value responsively to the over-voltage condition. Additionally, detection circuit 60 is configured to cause current 64 to flow through input 44 at a first value, to change the first value to a second value responsively to the over-temperature condition, to cause current 32 to flow into input 44 from external to controller 35 responsively to the over-voltage condition and change the first value to a third value, and to sum current 32 with current 63.

In order to facilitate this functionality for controller 35, regulator 39 is connected to receive the input voltage between input 37 and return 38. A first terminal of current source 62 is connected to an output of regulator 39 and a second terminal is connected to a drain of transistor 67. A source of transistor 67 is commonly connected to a non-inverting input of amplifier 66, input 44, and a first terminal of current sense circuit 70. A second terminal of circuit 70 is connected to return 38. An output of amplifier 66 is connected to a gate of transistor 67 and an inverting input of amplifier 66 is connected to an output of ref 65. An output of circuit 70 is commonly connected to a non-inverting input of comparator 71 and to an inverting input of comparator 74. An inverting input of comparator 71 is connected to an output of current reference generator 72. A non-inverting input of comparator 74 is connected to an output of current reference generator 75. The output of comparator 74 is connected to a first input of gate 78 which has a second input connected to the output of comparator 71. The output of gate 78 is connected to reset input of latch 79. A Q output of latch 79 is coupled to switching control circuit 45.

Input 44 is connected to a first terminal of NTC resistor 33 which has a second terminal connected to terminal 12. An anode of diode 31 is connected to input 44 and a cathode is connected to node 25.

Figure 2:
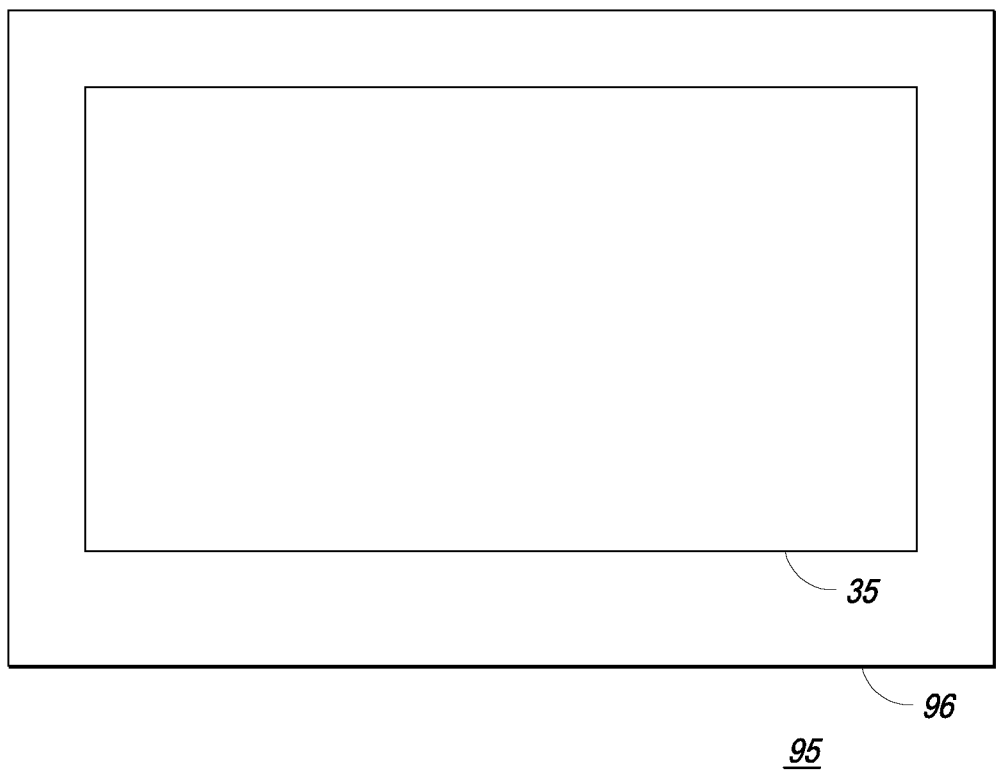
FIG. 2 illustrates an enlarged plan view of a semiconductor device that includes the power supply controller of FIG. 1 in accordance with the present invention.

FIG. 2 illustrates an enlarged plan view of a portion of an embodiment of a semiconductor device or integrated circuit 95 that is formed on a semiconductor die 96. Controller 35 is formed on die 96. Die 96 may also include other circuits that are not shown in FIG. 2 for simplicity of the drawing. Controller 35 and device or integrated circuit 95 are formed on die 96 by semiconductor manufacturing techniques that are well known to those skilled in the art.

In view of all of the above, it is evident that a novel device and method is disclosed. Included, among other features, is forming a detection circuit of a power supply controller to clamp an input to a voltage and to couple a current to the input to form a sense signal that represents two different operating conditions. One value of the current represents a normal operating condition, a second value represents a first non-normal operating condition (such as an over-temperature condition), and another value of the current represents a second non-normal operating condition (such as an over-voltage condition). Using current values to represent the conditions eliminates current to voltage translations thereby improving the accuracy of the detection circuit of the controller. Using only one terminal of the semiconductor die to detect two conditions allows using other terminals for other functions and reduces the cost of the semiconductor device.

While the subject matter of the invention is described with specific preferred embodiments, it is evident that many alternatives and variations will be apparent to those skilled in the semiconductor arts. Although the subject matter of the invention is described using an exemplary embodiment of a fixed frequency buck power supply controller, the invention is applicable to other circuits that detect two different conditions on one terminal and is not limited to power supply configurations. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a power supply controller comprising:
   configuring the power supply controller to form a switching drive signal to operate a switch and regulate and output voltage to a desired value;
   configuring a detection circuit to maintain a first input of the power supply controller at substantially a first voltage value and to couple a control current to the first input wherein a first portion of the control current flows through the first input responsively to a first condition leaving a second portion of the control current and wherein another current flows to the first input from external to the power supply controller responsively to a second condition; and
   configuring the power supply controller to negate the switching drive signal responsively to a first value of the first portion of the control current and to negate the switching drive signal responsively to a first value of the another current.

2. The method of claim 1 wherein configuring the detection circuit to maintain the first input of the power supply controller at substantially the first voltage value and to couple the control current to the first input includes configuring the detection circuit to clamp the first input to the first voltage value and to sum the control current with the another current at the first input.

3. The method of claim 1 wherein configuring the power supply controller to negate the switching drive signal includes configuring the detection circuit to detect the second portion of the control current and responsively negate the switching drive signal.

4. The method of claim 3 wherein configuring the detection circuit to detect the second portion of the control current includes configuring a current comparator to compare the second portion of the control current to a reference current.

5. The method, of claim 3 wherein configuring the power supply controller to negate the switching drive signal includes configuring the detection circuit to detect the another current and responsively negate the switching drive signal.

6. The method of claim 5 wherein configuring the detection circuit to detect the another current includes configuring a current comparator to compare a combination of at least a portion of the another current and at least a portion of the control current to a reference current.

7. A switching power supply controller comprising:
   a switching control circuit configured to form a switching drive signal to operate a switch and regulate and output voltage to a desired value;
   a first input configured to form a sense signal that is representative of both an over-temperature condition and an over-voltage condition;
   a detection circuit configured to maintain the first input at substantially a first voltage value and to couple a control current having a first value to the first input, the detection circuit configured to receive the sense signal and change the first value to a second value responsively to the over-temperature condition and to change the first value to a third value responsively to the over-voltage condition; and
   the detection circuit configured to negate the switching drive signal responsively to the second value or responsively to the third value.

8. The switching power supply controller of claim 7 wherein the second value is less than the first value and the third value is greater than the first value.

9. The switching power supply controller of claim 7 wherein the detection circuit includes a shunt regulator configured to maintain the first input at the first voltage for the over-temperature condition and for the over-voltage condition.

10. The switching power supply controller of claim 9 wherein the detection circuit includes a first current source that is configured to couple the control current to the first input.

11. The switching power supply controller of claim 9 wherein the detection circuit includes a first current comparator that is configured to receive the control current and detect the third value.

12. The switching power supply controller of claim 11 wherein the detection circuit includes a second current comparator that is configured to receive the control current and detect the second value.

13. The switching power supply controller of claim 12 wherein the detection circuit includes a logic circuit coupled to assert a control signal responsively to an output of the first current comparator and to an output of the second current comparator.

14. The switching power supply controller of claim 13 wherein the logic circuit includes an OR gate having a first input coupled to receive the output of the first current comparator, a second input coupled to receive the output of the second current comparator, and an output.

15. The switching power supply controller of claim 14 wherein the logic circuit includes a latch configured to be set responsively to the output of the OR gate.

16. A method of forming a detection circuit to detect two different conditions on a single input comprising:
configuring the detection circuit to maintain the single input at substantially a first voltage value, to form a control current having a first portion and a second portion, and to couple the control current to the single input;
configuring the detection circuit to cause the first portion of the control current to flow through the single input with a first value responsively to a first condition, to cause a first current to flow into the single input from external to the detection circuit responsively to a second condition; and
configuring the detection circuit to sum the control current with the first current.

17. The method of claim 16 wherein configuring the detection circuit to sum the control current with the first current includes configuring the detection circuit as a portion of a power supply controller wherein the first current flows into the single input from external to controller and further including configuring the detection circuit to sum the control current with the first current at the single input.

18. The method of claim 16 wherein configuring the detection circuit to cause the first portion of the control current to flow through the single input responsively to the first condition includes configuring the detection circuit to cause the first portion of the control current to flow through the single input responsively to an over-temperature condition and to cause the first current to flow into the single input responsively to an over-voltage condition.

19. The method of claim 16 wherein configuring the detection circuit to maintain the single input at substantially the first voltage value, to form a control current having a first portion and a second portion, and to couple the control current to the single input includes configuring the detection circuit as a portion of a power supply controller, configuring the detection circuit to clamp the single input to the first voltage value, configuring the detection circuit to form the control current having a fixed value wherein the first and second portions sum to the fixed value and wherein the first portion of the control current flows through the single input responsively to a decrease in a resistance that is external to the controller.

20. The method of claim 16 further including configuring the detection circuit as a portion of a controller and configuring the detection circuit to cause the first current to flow into the single input responsively to an increase in a voltage that is external to the controller.

\* \* \* \* \*